(12) United States Patent
Wetterwald et al.

(10) Patent No.: US 10,897,516 B2
(45) Date of Patent: Jan. 19, 2021

(54) APPLICATION BUFFERING OF PACKETS BY FOG COMPUTING NODE FOR DETERMINISTIC NETWORK TRANSPORT

(71) Applicant: Cisco Technology, Inc., San Jose, CA (US)

(72) Inventors: Patrick Wetterwald, Mouans Sartoux (FR); Pascal Thubert, La Colle sur Loup (FR); Maik Guenter Seewald, Nuremberg (DE); Eric Michel Levy-Abegnoli, Valbonne (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 271 days.

(21) Appl. No.: 15/813,289

(22) Filed: Nov. 15, 2017

(65) Prior Publication Data
US 2019/0149629 A1     May 16, 2019

(51) Int. Cl.
*H04L 29/08*     (2006.01)
*H04L 12/18*     (2006.01)

(52) U.S. Cl.
CPC .......... *H04L 67/2842* (2013.01); *H04L 12/18* (2013.01); *H04L 67/2847* (2013.01); *H04L 12/185* (2013.01); *H04L 67/06* (2013.01)

(58) Field of Classification Search
CPC ..... H04L 67/2842; H04L 12/18; H04L 67/06; H04L 45/24; H04L 47/125; H04W 72/042; H04W 4/70
See application file for complete search history.

(56) References Cited

U.S. PATENT DOCUMENTS

| 9,232,433 | B2 | 1/2016 | Subramanian et al. |
| 9,479,457 | B2 | 10/2016 | Sindhu |
| 9,485,157 | B2 | 11/2016 | Thubert et al. |
| 9,606,817 | B1 * | 3/2017 | Efstathopoulos ... G06F 9/45533 |
| 9,686,124 | B2 | 6/2017 | Ameixiera |

(Continued)

OTHER PUBLICATIONS

Cisco, "Cisco Wireless Gateway for LoRaWAN Data Sheet", [online], Jul. 14, 2017, [retrieved on Oct. 26, 2017]. Retrieved from the Internet: <URL: https://www.cisco.com/c/en/us/products/collateral/se/internet-of-things/datasheet-c78-737307.html>, pp. 1-17.
Cisco, "Fog Computing and the Internet of Things: Extend the Cloud to Where the Things Are", [online] White Paper, 2015, [retrieved on Oct. 25, 2017]. Retrieved from the Internet: <URL: https://www.cisco.com/c/dam/en_us/solutions/trends/iot/docs/computing-overview.pdf>, pp. 1-6.

(Continued)

*Primary Examiner* — Dhairya A Patel
*Assistant Examiner* — Sujana Khakural
(74) *Attorney, Agent, or Firm* — Leon R. Turkevich

(57) ABSTRACT

In one embodiment, a method comprises: storing, by a computing device in a non-deterministic data network, a plurality of data packets originated by a source device into a mass storage medium associated with the computing device; receiving, by the computing device, a data request originated by an access point device providing deterministic reachability to a deterministic device in a deterministic data network providing reachability to multiple deterministic devices, the request specifying one or more deterministic constraints associated with reaching the deterministic device; and supplying, by the computing device, a selected one of the data packets to the access point device for delivery of data stored therein to the deterministic device according to the one or more deterministic constraints.

19 Claims, 5 Drawing Sheets

(56) References Cited

U.S. PATENT DOCUMENTS

| | | | |
|---|---|---|---|
| 2005/0100016 A1* | 5/2005 | Miller | H04L 1/1809 370/390 |
| 2008/0140941 A1* | 6/2008 | Dasgupta | G06F 16/172 711/137 |
| 2010/0070570 A1* | 3/2010 | Lepeska | H04L 67/2857 709/203 |
| 2011/0255535 A1* | 10/2011 | Tinsman | H04N 21/4431 370/390 |
| 2013/0297904 A1* | 11/2013 | Stanfill | G06F 9/544 711/165 |
| 2014/0122866 A1* | 5/2014 | Haeger | H04L 63/061 713/153 |
| 2014/0136952 A1 | 5/2014 | Zhu et al. | |
| 2015/0154418 A1* | 6/2015 | Redberg | G06F 21/6218 713/165 |
| 2015/0271151 A1* | 9/2015 | Brugger | H04L 63/0428 713/165 |
| 2016/0154707 A1* | 6/2016 | Kumarasamy | G06F 16/134 707/649 |
| 2016/0269096 A1 | 9/2016 | Thubert et al. | |
| 2016/0308793 A1 | 10/2016 | Levy-Abegnoli et al. | |
| 2017/0039218 A1* | 2/2017 | Prahlad | G06F 3/0667 |
| 2017/0222920 A1 | 8/2017 | Thubert et al. | |
| 2018/0109428 A1* | 4/2018 | Kattepur | H04W 4/70 |
| 2018/0357561 A1* | 12/2018 | Selvarajan | G06F 16/2379 |

OTHER PUBLICATIONS

Wetterwald et al., U.S. Appl. No. 15/291,211, filed Oct. 12, 2016.

Thubert, Ed., "A Transport Layer for Deterministic Networks", [online], Oct. 24, 2017, [retrieved on Oct. 26, 2017]. Retrieved from the Internet: <URL: https://tools.ietf.org/pdf/draft-thubert-tsvwg-detnet-transport-00.pdf>, pp. 1-21.

St. John, "Cisco and Bit Stew Are Turning Grid Routers Into Virtual Servers", [online], Jul. 22, 2014, [retrieved on Oct. 26, 2017]. Retrieved from the Internet: <URL: https://www.greentechmedia.com/articles/read/turning-grid-routers-into-virtual-servers#gs.vLblaAA>, pp. 1-4.

Kiriha et al., "Survey on Data Center Networking Technologies", IEICE Trans., Commun., vol. E96-B, No. 3, Mar. 2013, pp. 713-721.

Wetterwald et al., U.S. Appl. No. 15/361,563, filed Nov. 28, 2016.

Thubert et al., U.S. Appl. No. 15/725,502, filed Oct. 5, 2017.

Thubert et al., "IETF 6TSCH: Combining IPv6 Connectivity with Industrial Performance" [online], Jul. 2013, [retrieved on Nov. 9, 2017]. Retrieved from the Internet: <URL: https://www.researchgate.net/profile/Pascal_Thubert/publication/261430569_IETF_6TSCH_Combining_IPv6_Connectivity_with_Industrial_Performance/links/56c4887c08ae7fd4625a28c8/IETF-6TSCH-Combining-IPv6-Connectivity-with-Industrial-Performance.pdf?origin=publication_detail>, pp. 1-7.

\* cited by examiner

APPLICATION BUFFERING OF PACKETS
BY FOG COMPUTING NODE FOR
DETERMINISTIC NETWORK TRANSPORT

TECHNICAL FIELD

The present disclosure generally relates to application buffering of packets by a fog computing node for deterministic network transport.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Engineering Task Force (IETF) is attempting to propose standards that can be applied to wireless devices for the stringent requirements of deterministic networks (e.g., minimal jitter, low latency, minimal packet loss). For example, Low power and Lossy Networks (LLNs) allow a large number (e.g., tens of thousands) of resource-constrained devices (e.g., battery-operated Internet-of-Things devices, or "IoT" devices) to be interconnected to form a wireless mesh network. The IETF has proposed a routing protocol ("6TiSCH") that provides IPv6 routing using time slotted channel hopping (TSCH) based on IEEE 802.15.4e, enabling LLN devices to use low-power operation and wireless channel hopping for higher reliability. Routes can be based on the routing protocol for LLNs (RPL).

The 6TiSCH architecture specifies a Channel distribution/usage (CDU) matrix of "cells", each cell representing a unique wireless channel at a unique timeslot.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
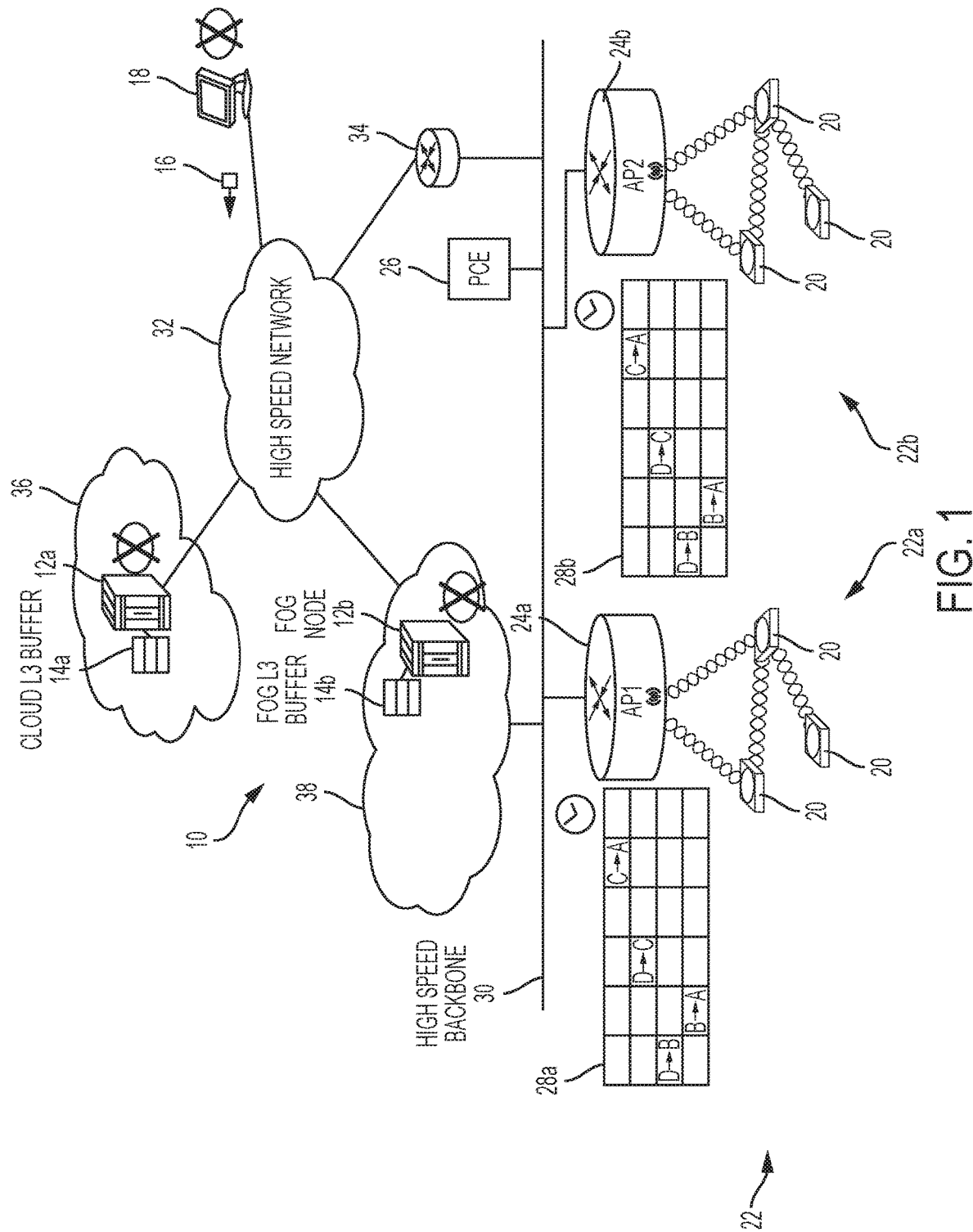
FIG. 1 illustrates an example system having a computing device for storing, in a mass storage device, data packets originated by a source device and destined for deterministic devices in a deterministic data network, and an access point device for retrieving a selected one of the data packets for deterministic transmission in the deterministic data network, according to an example embodiment.

In one embodiment, a method comprises: storing, by a computing device in a non-deterministic data network, a plurality of data packets originated by a source device into a mass storage medium associated with the computing device; receiving, by the computing device, a data request originated by an access point device providing deterministic reachability to a deterministic device in a deterministic data network providing reachability to multiple deterministic devices, the request specifying one or more deterministic constraints associated with reaching the deterministic device; and supplying, by the computing device, a selected one of the data packets to the access point device for delivery of data stored therein to the deterministic device according to the one or more deterministic constraints.

In another embodiment, an apparatus comprises a device interface circuit and a processor circuit. The device interface circuit is configured for receiving, via a non-deterministic data network, a plurality of data packets originated by a source device. The processor circuit is configured for storing the data packets into a mass storage medium associated with the apparatus. The device interface circuit further is configured for receiving a data request originated by an access point device providing deterministic reachability to a deterministic device in a deterministic data network providing reachability to multiple deterministic devices. The request specifies one or more deterministic constraints associated with reaching the deterministic device. The processor circuit further is configured for supplying, via the device interface circuit, a selected one of the data packets to the access point device for delivery of data stored therein to the deterministic device according to the one or more deterministic constraints.

In another embodiment, one or more non-transitory tangible media is encoded with logic for execution by a machine and when executed by the machine operable for: storing, by the machine implemented as a computing device in a non-deterministic data network, a plurality of data packets originated by a source device into a mass storage medium associated with the computing device; receiving, by the computing device, a data request originated by an access point device providing deterministic reachability to a deterministic device in a deterministic data network providing reachability to multiple deterministic devices, the request specifying one or more deterministic constraints associated with reaching the deterministic device; and supplying, by the computing device, a selected one of the data packets to the access point device for delivery of data stored therein to the deterministic device according to the one or more deterministic constraints.

In another embodiment, a method comprises: identifying, by an access point device, one or more deterministic constraints for transmitting a data packet originated by a source device and destined for a deterministic device via a deterministic data network; sending, by the access point device to a computing device providing mass storage for data originated by the source device and destined for the deterministic data network, a request to the computing device via a non-deterministic data network, the request for transfer of the data packet destined for the deterministic device, the request specifying one or more deterministic constraints associated with deterministic transmission of the data packet according to a deterministic transmission instance; and deterministically transmitting the data packet into the deterministic data network at the deterministic transmission instance, by the access point device, in response to receipt thereof from the computing device via the non-deterministic data network.

DETAILED DESCRIPTION

Particular embodiments enable mass storage of data packets, originated by a source device and destined for deterministic devices in a deterministic data network, by a computing device in a non-deterministic data network. The mass storage by the computing device enables network layer (layer 3) buffering of data packets without requiring synchronizing between a source device and an access point device providing deterministic reachability to the deterministic devices in the deterministic data network.

Additional embodiments enable the access point device to send, to the computing device providing mass storage for data originated by the source device and destined for the deterministic data network, a request for transfer of a data packet to be transmitted for a deterministic device according to deterministic constraints associated with deterministic transmission of the data packet by the access point device. The request enables the access point device to deterministically transmit the data packet into the deterministic data network at a deterministic transmission instance according to the deterministic constraints.

Hence, the mass storage by the computing device (having a storage capacity on the order of terabytes or higher) can eliminate any imposition of increased storage requirements for the access point device injecting the data packets into the deterministic data network. In particular, the access point device can be configured for providing deterministic transmission of data packets to numerous deterministic devices in the deterministic data network: in the case of resource-constrained LLN devices such as battery-operated Internet of Things (IoT) devices, the deterministic data network may provide deterministic transmission of data packets to hundreds, thousands, or tens of thousands of resource-constrained devices. Further, the deterministic data network may provide a substantially slower throughput and/or bandwidth for reaching a destination deterministic device (e.g., up to around fifteen (15) minutes for a data packet (e.g., a UDP packet) to reach a deterministic device via a wireless 6TiSCH network), compared to a high-speed backbone data network (e.g., an Ethernet or Internet-Protocol based local area network or wide area network such as the Internet) that is used by the source device for burst transmission of the data packets toward the access point for multiple resource-constrained devices; hence, any attempt to require an access point to buffer application data originated by a source device (operating, for example, at 100 Mbits/s or higher) for hundreds or thousands of resource-constrained deterministic devices (e.g., IoT devices) would quickly overwhelm the storage capacity of the access point device, which typically would be limited to ten (10) Gigabytes (Gb) or less.

Hence, the mass storage by the computing device as described herein enables a source device to provide a burst transmission of data packets via a high-speed backbone network between the source device and the access point device, without any need of synchronization of the source device relative to the deterministic constraints of the deterministic data network served by the access point device, and without any need for additional storage capacity by the access point device. In one embodiment, the burst of data packets can be stored initially in the computing device, implemented for example as a fog-based computing device or as a cloud-based computing device; alternately, the burst of data packets can be forwarded, by the access point device, to the computing device for overflow storage of data packets exceeding the storage capacity of the access point device.

FIG. 1 illustrates an example system 10 having a computing device 12 (e.g., 12a and/or 12b) configured for storing, in a mass storage device 14 (e.g., 14a and/or 14b), data packets 16 originated by a source device 18 and destined for deterministic devices 20 in a deterministic data network 22, according to an example embodiment. The system 10 also includes one or more deterministic access point devices 24 (e.g., "AP1" 24a, "AP2" 24b) for retrieving a selected one of the data packets 16 for deterministic transmission in a corresponding deterministic data network (e.g., 22a and/or 22b), according to an example embodiment. The system 10 also can include a network manager 26, for example a Path Computation Element (PCE) configured for establishing the deterministic data networks 22 according to one or more deterministic constraints 28 (e.g., 28a and/or 28b), illustrated for example in FIG. 1 as a first 6TiSCH CDU matrix 28a for the deterministic data network 22a, and a second 6TiSCH CDU matrix 28b for the deterministic data network 22b.

The system 10 also can include a first (non-deterministic) high-speed backbone network 30 for communications between the deterministic access point devices 24a, 24b, the network manager 26, and the fog-based computing device 12b in a fog-based computing network 38, described below. The system 10 also can include a second (non-deterministic) high-speed data network 32, for example a local area network (LAN) and/or wide area network (WAN) such as the Internet or a Connected Grid, for providing reachability between the source device 18 and the cloud-based computing device 12a (deployed within a cloud-based computing network 36) and/or the fog-based computing device 12b. The system 10 also can include one or more router devices 34 configured for providing reachability between any one of the deterministic access point devices 24, the network manager 26, the cloud-based computing device 12a, and/or the source device 18. Hence, depending on implementation, different example embodiments can use any one of the cloud-based computing device 12a of the cloud-based computing network 36 and/or the fog-based computing device 12b of the fog-based computing network 38 for buffering of the data packets 16 output by the source device 18 as described herein.

Each of the deterministic data networks 22a and/or 22b can be implemented in any one of different types of deterministic data networks. Example implementations of any one of the deterministic data networks 22 can include a wired or wireless 6TiSCH low-power and lossy network, a wired or wireless Time Sensitive Network (TSN), an Audio Video Bridging (AVB) network, a LoRA-based network as specified by the LoRA Alliance, etc. Hence, the deterministic data network 22a can be implemented by the corresponding access point device 24a as one type of deterministic data network (e.g., wireless 6TiSCH LLN), whereas the deterministic data network 22b can be implemented by the corresponding access point device 24b as a second different type of deterministic data network (e.g., wireless LoRA); alternately, the deterministic data network 22a and the deterministic data network 22b can be implemented as the same type of deterministic data network (e.g., 6TiSCH LLN) using respective 6TiSCH CDU matrices 28a and 28b.

Although the high-speed backbone data network 30 and the high-speed data network 32 are identified as "non-deterministic" because they can be susceptible to TCP/IP-based variations in bandwidth, packet loss, jitter, latency, etc., the overall bandwidth and/or throughput of the non-deterministic data networks 30 and 32 can be substantially higher than the throughput of the deterministic data network 22 that operates according to strict deterministic constraints 28. For example, the high-speed backbone data network 30 and the high-speed data network 32 can operate at bandwidth rates of 1 Gigabit/sec. or higher, whereas the deterministic data network 22 may operate at substantially lower throughput rates (e.g., each deterministic device 20 can receive a data packet no more than once every five (5) minutes) due to providing deterministic transmissions for LLN devices.

Each deterministic data network 22 is established based on the corresponding access point device 24 serving as a "root" or "gateway" for the deterministic devices 20 in the corresponding deterministic data network 22. Any one access point device 24 can be implemented for example as a connected grid router (CGR) for a Smart Grid, using for example a commercially-available Cisco® 1000 Series Connected Grid Router from Cisco Systems, San Jose, Calif.; any one access point device 24 also can be implemented for example as a commercially-available Cisco® IXM (IoT Extension Module) Gateway from Cisco Systems. Other network devices can be used for deployment of any one access point device 24 that establishes a corresponding deterministic data network 22.

Each access point device 24 can establish one or more deterministic paths for reaching a corresponding deterministic device 20, including a first "downward" deterministic path (or "track") for sending data from the access point device 24 to the corresponding deterministic device 20, and a second "upward" deterministic path (or "track") for sending data from the corresponding deterministic device 20 to the access point device 24. Each deterministic path can be established according to a corresponding set of deterministic constraints 28 established by the corresponding access point device 24 and/or by the network manager 26. As described below, the network manager 26 can establish the deterministic paths according to associated deterministic constraints, enabling for example a wireless deterministic device 20 to "roam" from the deterministic data network 22a to the deterministic data network 22b. Depending on implementation, the deterministic data network 22 can be configured for providing deterministic communications for constrained network devices 20 such as LLN devices; as such the deterministic data network 22 can have a substantially slower throughput (on the order of minutes) compared to any of the high-speed backbone data network 30 or the high-speed data network 32.

Hence, the computing device 12 can provide buffering in its corresponding mass storage device 14 for buffering of bursts of data packet 16 from the source device 18, while awaiting deterministic transmission by the deterministic access point devices 24 according to the deterministic constraints (that may be substantially slower than the data bursts originated by the source device 18).

Figure 2:
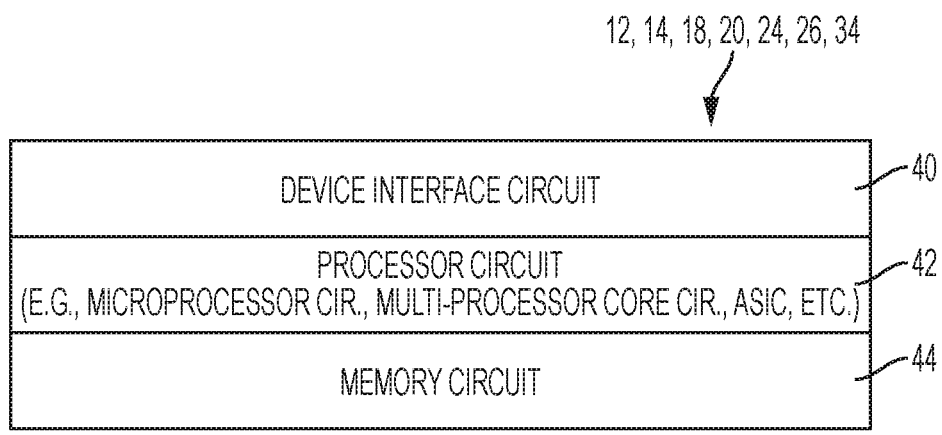
FIG. 2 illustrates an example implementation of any one of the devices of FIG. 1, according to an example embodiment.

FIG. 2 illustrates an example implementation of any one of the devices 12, 14, 18, 20, 24, 26, and/or 34 of FIG. 1, according to an example embodiment. Each apparatus 12, 14, 18, 20, 24, 26, and/or 34 is a physical machine (i.e., a hardware device) configured for implementing network communications with other physical machines. Each apparatus 12, 14, 18, 20, 24, 26, and/or 34 can include a device interface circuit 40, a processor circuit 42, and a memory circuit 44. The device interface circuit 40 can include one or more distinct physical layer transceivers for communication with any one of the other devices 12, 14, 18, 20, 24, 26, and/or 34; the device interface circuit 40 also can include an IEEE based Ethernet transceiver for communications with the devices of FIG. 1 via any type of data link (e.g., a wired or wireless link, an optical link, etc.). The processor circuit 42 can be configured for executing any of the operations described herein, and the memory circuit 44 can be configured for storing any data or data packets as described herein.

Any of the disclosed circuits of the devices 12, 14, 18, 20, 24, 26, and/or 34 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/ packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3A:
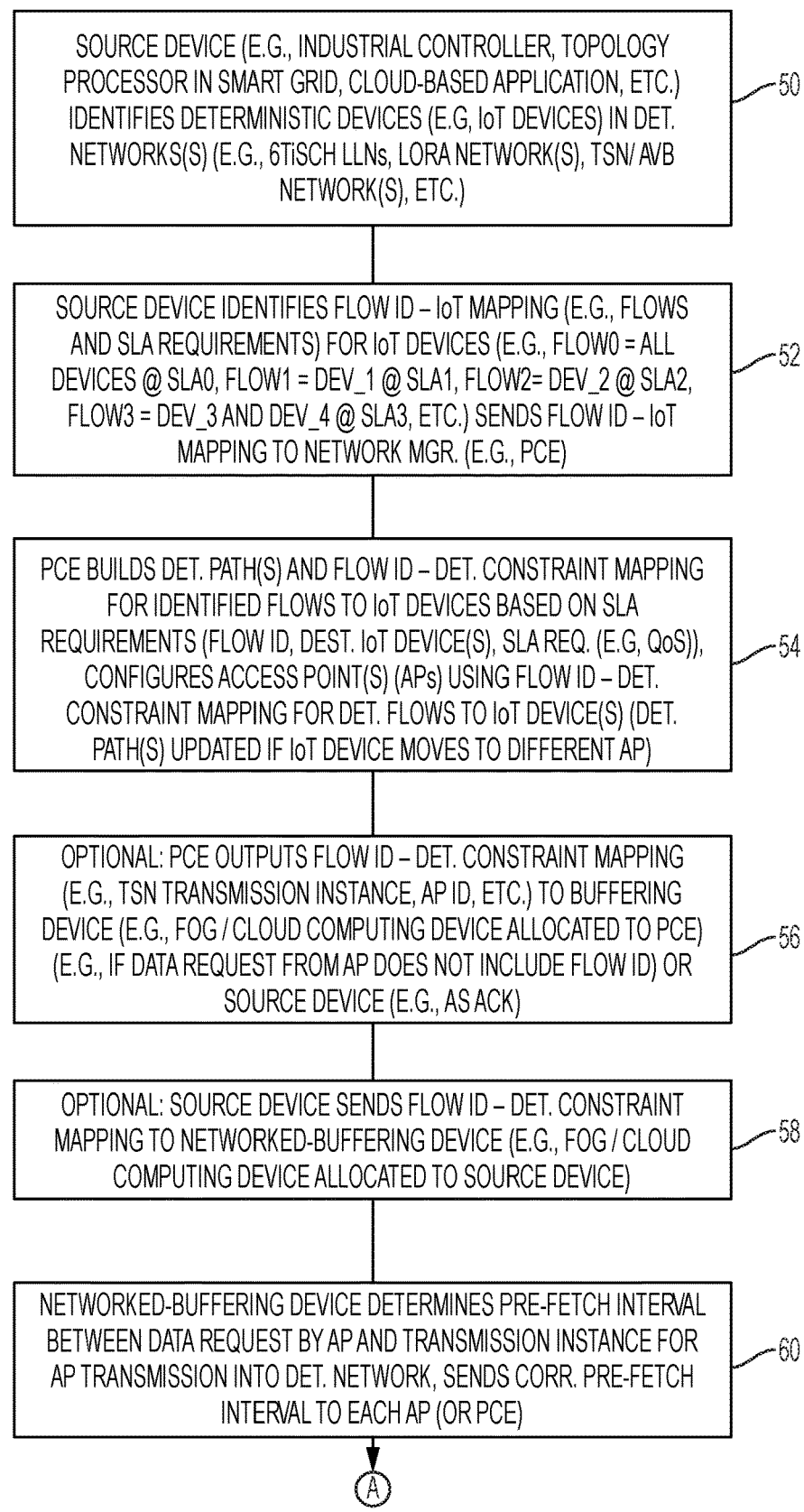
FIGS. 3A-3C illustrate an example method of storing, into a mass storage device by a computing device, a plurality of data packets originated by a source device and exceeding storage capabilities of an access point device, and the retrieval and deterministic transmission of a selected data packet into a deterministic data network, according to an example embodiment.
Figure 3B:
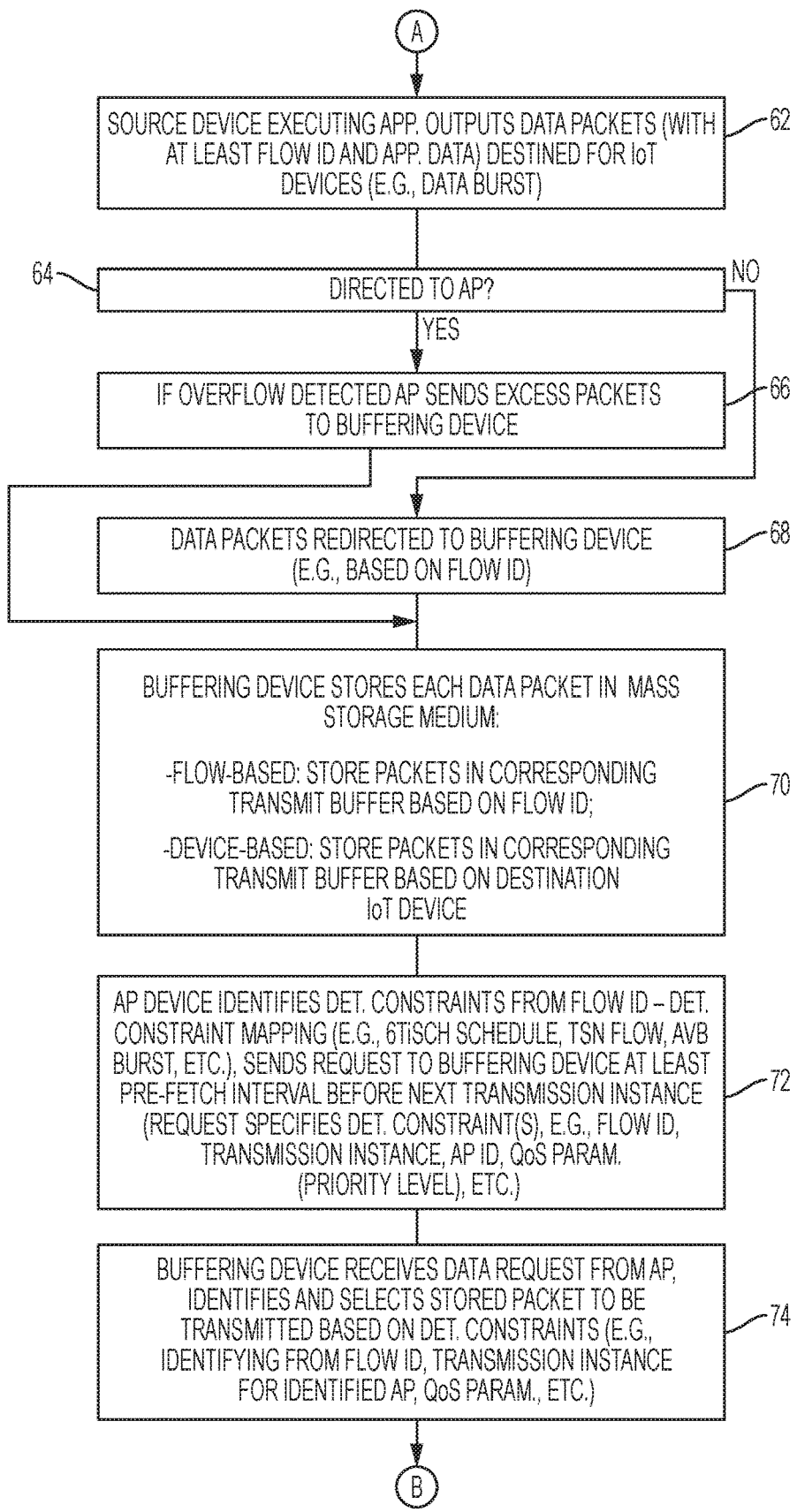
Figure 3C:
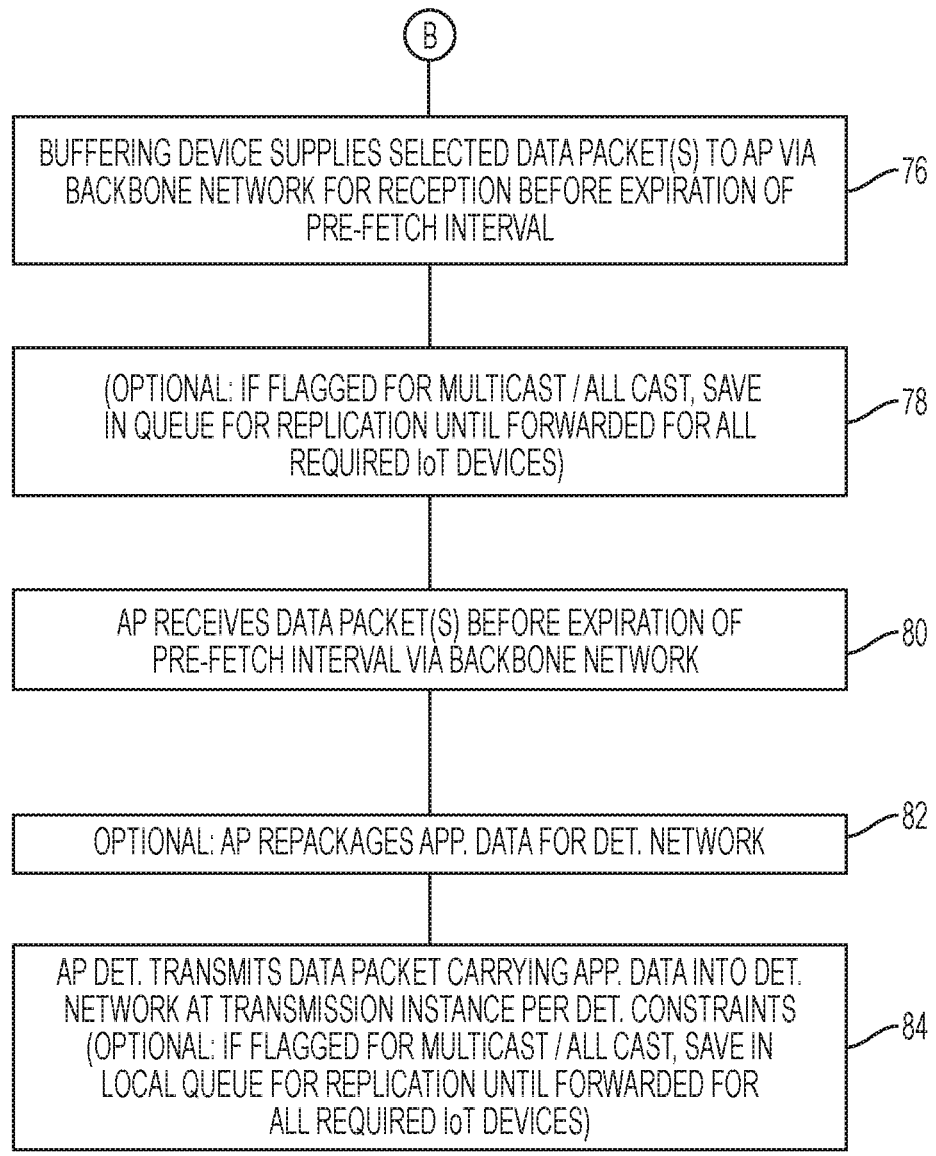

FIGS. 3A-3C illustrate an example method of storing, into a mass storage device by a computing device, a plurality of data packets originated by a source device and exceeding storage capabilities of an access point device, and the retrieval and deterministic transmission of a selected data packet into a deterministic data network, according to an example embodiment. The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 3A the processor circuit 42 of the source device 18 in operation 50 can identify deterministic devices 20 in the deterministic data networks 22 that are to receive data (e.g., in the form of a data packet 16) from the source device 18. The source device 18 can be implemented as any type of device that sends data to the deterministic devices 20, for example an industrial controller (e.g., PLC) in an industrial environment such as an automated factory, a topology processor in a smart grid of a power utility system, a cloud-based executable application, a management entity configured for providing data or management alerts, executable code such as software patches, etc. As described previously, any one of the deterministic data networks 22 can be implemented as any one of a wired and/or wireless 6TiSCH network such as an LLN, a wired and/or wireless LORA network, a wired and/or wireless TSN or AVB network, or any combination thereof.

The source device 18 in operation 52 can identify a flow identifier—IoT device mapping for each of the deterministic devices 20. A flow identifier is an illustration of one type of identifier that can be used to establish a deterministic constraint for one or more deterministic devices 20. A deterministic constraint can include any one or more of a deterministic parameter associated with a deterministic data network 22, for example a transmission schedule established for an identified deterministic device 20 relative to: (1) a period of time "T"; (2) a maximum packet size "F"; and a maximum number of data packets "N" that can be transmitted on a deterministic link within the period of time "T"; as illustrated in FIG. 1, a deterministic constraint 28 also can be implemented using one or more cells of a 6TiSCH CDU matrix (e.g., 28a); a deterministic constraint 28 also can be implemented using an allocation of transmission credits along an identified path in an AVB-based network, etc. A deterministic constraint 28 also can be implemented based on different quality of service (QoS) parameters (e.g., maximum jitter, maximum latency, minimum bandwidth, minimum/maximum burst size, etc.).

The source device 18 in operation 52 can establish the flow ID—IoT device mapping on a per-flow basis, for example where a flow identifier "FLOW0" can refer to an "all nodes" broadcast for all devices 20 in the deterministic data network 22 using a prescribed quality of service identified by a service level agreement (SLA) level of "SLA0" (e.g., SLA0 specifies sending a UDP packet within twenty-four (24) hours); flow identifiers "FLOW1" and "FLOW2" can refer to unicast transmissions to identified devices "DEV_1" and "DEV_2" 20 at prescribed quality of services identified by "SLA1" and "SLA2", respectively (e.g., SLA1 and SLA2 specify sending a UDP packet within fifteen (15) minutes and thirty (30) minutes, respectively); and the flow identifier "FLOW3" can refer to a multicast to identified network devices "DEV_3" and "DEV_4" 20 in one or more of the deterministic data networks 22 according to a prescribed quality of service identified by "SLA3" (e.g., SLA3 specifies sending a UDP packet within thirty (30) minutes). The flow ID—IoT device mappings also can be generated by a different computing device in the event that the management of the deterministic devices 20 is executed by the different computing device distinct from the source device 18 outputting the data packets 16 that are destined for the deterministic devices 20.

The source device 18 (or a different computing device) in operation 52 can send the flow ID—IoT device mappings to the network manager 26 (e.g., via the high-speed data network 32 and the router device 34). The network manager 26 in operation 54 can respond to the flow ID—IoT device mappings by building, within the deterministic data networks 22, the deterministic paths for reaching each of the deterministic devices 20 according to the deterministic constraints 28 requested in the flow ID—IoT device mappings. For example, the network manager 26 in operation 54 can establish one or more deterministic paths for reaching one or more identified deterministic devices 20 based on any one of flow identifier, destination device identifier (e.g., Internet Protocol (IP) address, as appropriate), etc. according to one or more deterministic constraints such as SLA requirements, QoS requirements, etc. The network manager 26 in operation 54 can establish a flow ID—deterministic constraint mapping that identifies, for each flow identifier, a corresponding deterministic constraint specifying one or more deterministic parameters that are to be enforced in the deterministic data network 22 for the flow identifier.

The network manager 26 in operation 54 can configure one or more of the deterministic access point devices 24 based on the flow ID—deterministic constraint mapping, enabling each access point device 24 (e.g., 24a) to deterministically transmit, into its corresponding deterministic data network 22 (e.g., 22a), data associated with a flow ID according to the corresponding deterministic constraint. Each access point device 24 (and/or intermediate deterministic device 20) also can be configured for executing packet replication and/or elimination, as appropriate, for deterministic transmission to a plurality of deterministic devices 20 with minimal load on the deterministic data network 22.

The network manager 26 also can update a deterministic path for reaching a mobile deterministic device 20, for example in response to detecting a mobile deterministic device 20 moves from a first deterministic data network 22a to a second deterministic data network 22b. The network manager 26 can send a first update instruction to the access point device 24a to disable deterministic transmissions to the mobile deterministic device 20, and the network manager 26 can send a second update instruction to the access point device 24b to start deterministic transmissions to the mobile deterministic device 20, in response to the network manager 26 detecting (via the deterministic access point devices 24a and 24b) that the mobile deterministic device 20 has moved from the deterministic data network 22a to the deterministic data network 22b.

Hence, the network manager 26 can establish the deterministic paths (according to the deterministic constraints 28)

for reaching the deterministic devices 20 in the deterministic data network 22, for deterministic transmission of data supplied by one or more data packets 16 according to a flow identifier specified in each data packet 16.

Depending on implementation, the network manager 26 in operation 56 can send the flow ID—deterministic constraint mapping to any one of the buffering device 12 (e.g., 12a for cloud-based buffering or 12b for fog-based buffering), or the source device 18 as an acknowledgment, depending on how the buffering device 12 is allocated in the system 10.

In one example of network-based buffering, if the network manager 26 allocates for itself the computing device 12 (e.g., the network administrator of the network manager 26 and the deterministic data network 22 deploys within its administrative domain the fog-based computing device 12b, or leases the cloud-based computing device 12a from a cloud-based service provider), the network manager 26 in operation 56 can supply the flow ID—deterministic constraint mapping to the cloud-based computing device 12a or the fog-based computing device 12b. The flow ID—deterministic constraint mapping can identify one or more deterministic constraints for the identified flows, for example a transmission instance identifier (e.g., TSN transmission identifier, 6TiSCH cell identifier, access point identifier (e.g., "AP1" or "AP2"), etc.), enabling the cloud-based computing device 12a and/or the fog-based computing device 12b to select a data packet from storage in its corresponding mass storage device 14 in response to a data request originated by any one of the deterministic access point devices 24. Hence, in this example the computing device 12 can identify a flow identifier for a data packet to be retrieved from the mass storage device 14 (even if not specified in a data request from the access point device 24), based on receiving the data request from an identifiable access point device 24 at an identifiable time that is at least a pre-fetch interval (described below) before an identifiable transmission instance, using the identifiable transmission instance as the deterministic constraint to identify the flow ID to be associated with the data request, and selecting one of the data packets stored in the mass storage device 14 based on the flow ID identified by the computing device 12 for supply to the requesting access point device 24.

In one example of source-based buffering, if the source device 18 allocates to itself the computing device 12 (e.g., the user or administrator of the source device 18 subscribes to utilize the buffering services provided by the cloud-based computing device 12a and/or the fog-based computing device 12b), such that the computing device 12 is "controlled" by the user of the source device 18, the source device 18 in operation 58 can send in operation 58 the flow ID—deterministic constraint to the cloud-based computing device 12a and/or the fog-based computing device 12b that is allocated to the source device 18. Hence, in this example the source device 18 can supply the necessary mapping to the computing device 12 (as opposed to the computing device 12 receiving the mapping from the network manager 26), enabling the computing device 12 to identify the deterministic constraints associated with each flow identifier.

In response to the computing device 12 receiving the flow ID—deterministic constraint mapping, the computing device 12 can determine in operation 60 a pre-fetch interval between a data request that is transmitted by an access point device 24 (via the high-speed backbone data network 30 and/or 32) for a data packet, and a transmission instance (e.g., a TSN transmission instance, a 6TiSCH cell, etc.) that identifies the time instance that the access point device 24 is required to transmit the data into the deterministic data network 22 according to the deterministic constraints 28. The pre-fetch interval determined by the computing device 12 can include a receiving network latency associated with the data request transmitted from the access point device 24 and reaching the computing device 12 via the high-speed backbone data network 30 and/or the high-speed data network 32, a local retrieval latency by the computing device 12 retrieving from its associated mass storage device 14 the stored data packet 16 for transmission, a transferring network latency associated with transferring the selected data packet 16 from the computing device 12 to the requesting access point device 24 via the high-speed backbone data network 30 and/or the high-speed data network 32, and a transmit queuing latency associated with the requesting access point device 24 receiving the selected data packet 16 and deterministically transmitting the data stored in the selected data packet 16 according to the deterministic constraints 28.

In the case of the deterministic data network 22 implemented as a LoRA network, the pre-fetch interval can be based on the receive delays following a transmission of a wireless data packet; in particular, a wireless transmission is followed by a first receive delay ("Receive_Delay1") prior to a first reception and a second receive delay ("Receive_Delay2") following the wireless transmission and prior to a second reception. The first receive delay ("Receive_Delay1") has a duration of about one second following the end of the wireless transmission, and the second receive delay ("Receive_Delay2") has a duration of about two seconds following the end of the wireless transmission, enabling an access point device 24 to retrieve the next data packet from a computing device 12 based on applying the receive delays within the pre-fetch interval.

The computing device 12 in operation 60 can send to each access point device 24 the corresponding pre-fetch interval (assuming each access point device 24 can have a different corresponding pre-fetch interval based on differing latencies), enabling each access point device 24 to determine a request instance for sending to the computing device 12 a request for the next data packet at least the pre-fetch interval before its next transmission instance. Alternately the computing device 12 can send one or more pre-fetch intervals to the network manager 26, enabling the network manager 26 to configure each of its access point devices 24 to send a corresponding request at the request instance at least the pre-fetch interval before the next transmission instance of the corresponding access point device 24.

Referring to FIG. 3B, the source device 18 in operation 62 can output one or more data packets 16 with a flow identifier (and/or destination IoT device identifier) and application data that is destined for the deterministic devices 20. As described previously, the source device 18 can send a plurality of data packets 16 as a burst transmission that substantially exceeds the storage capacity of the deterministic access point devices 24.

In one embodiment the burst transmission of data packets 16 can be directed toward one or more access point devices 24, for example according to existing network routing protocols (e.g., Internet Protocol, etc.) that direct the burst transmission of the data packets 16 to the deterministic access point devices 24 via the router device 34. Hence, in response to one or more access point devices 24 receiving in operation 64 a burst transmission of data packets 16, the processor circuit 42 of a receiving access point device 24 in operation 66 can send excess packets to the computing device 12 (registered previously with the access point device 24 in operation 60) in response to the access point device 24 detecting the excess packets create an overflow condition in the transmit buffers of the access point device 24. The computing device 12, in response to receiving the excess data packets 16 from the access point device 24 for overflow storage, can store the excess data packets 16 in its associated mass storage device 14 until requested by the access point device 24 (at least the pre-fetch interval before the associated transmission instance), described below.

If the burst transmission of data packets 16 is not directed to one or more access point devices 24 as described above with respect to operations 64 and 66, the burst of data packets 16 output by the by the source device 18 can be directed in operation 68 to the computing device 12 of the cloud-based computing network 36 for storage in the associated mass storage device 14a. The burst of data packets 16 in operation 68 also can be directed, redirected, and/or intercepted by the fog-based computing network 38 in the data transmission path between the source device 18 and the deterministic access point devices 24, for storage by the fog-based computing device 12b into the associated mass storage device 14b.

Hence, the device interface circuit 40 of each computing device 12 in operation 70 can receive a burst (or portion thereof) of data packets 16 from the source device 18 and/or an access point device 24. The processor circuit 42 of each computing device 12 in operation 70 can store a plurality of data packets 16 originated by the source device 18 into its associated mass storage device 14, for mass storage until the pre-fetch interval before deterministic transmission thereof by one or more of the deterministic access point devices 24 into the deterministic data network 22. In one example embodiment, the computing device 12 in operation 70 can store (into its associated mass storage device 14) any one or more of the received data packets 16 in a corresponding transmit buffer according to flow identifier, where each flow identifier can have a corresponding transmit buffer in the mass storage device 14; in another embodiment, the computing device 12 in operation 70 can store (into its associated mass storage device 14) any one or more of the received data packets 16 into a corresponding transmit buffer according to the destination deterministic device 20, where each deterministic device 20 can have a corresponding transmit buffer in the mass storage device 14; the computing device 12 also can establish different transmit buffers based on other attributes, for example type of deterministic device 20 (e.g., sensor device type, actuator device type, robot device type, controller device type, etc.), type of data traffic (e.g., management data, query data, etc.).

In response to configuration by the network manager 26, each access point device 24 can identify its deterministic constraints 28 based on the flow ID—deterministic constraint mapping established by the network manager 26, where the deterministic constraints can include any one of a 6TiSCH CDU matrix 28a or 28b, a TSN flow, an AVB burst, etc. Hence, each access point device 24 can respond to its deterministic constraints 28 (e.g., deterministic schedule) by originating and sending in operation 72 its data request, to the cloud-based computing device 12a and/or the fog-based computing device 12b, at least the pre-fetch interval before its next transmission instance. As described previously, the data request can be sent via any one of the high-speed backbone data network 30 and the fog-based computing network 38 for reaching the fog-based computing device 12b, and/or the high-speed backbone data network 30, the router device 34, and the high-speed data network 32 for reaching the cloud-based computing device 12a in the cloud-based computing network 36. The data request can specify any one or more of different deterministic constraints, for example flow identifier, transmission instance identifier that identifies the transmission instance associated with the requested data (e.g., 6TiSCH timeslot value relative to an epochal start time, TSN start time, etc.), access point identifier, QoS parameters (e.g. priority level), etc.

In response to the device interface circuit 40 of the computing device 12 (e.g., 12a and/or 12b) receiving in operation 74 the data request from the identified access point device 24 (e.g., 24a or 24b), the processor circuit 42 of the computing device 12 in operation 74 can identify and select a stored data packet 16 to be retrieved and transmitted based on the deterministic constraints identified by the computing device 12 as associated with the request (e.g., flow ID, transmission instance for identified access point, QoS parameters, etc.). As described previously, the deterministic constraints can be either specified in the data request from the access point device 24, and/or obtained by the computing device 12 from the network manager 26 and/or the source device 18. Hence, the computing device 12 can select one of the stored data packets 16 based on the deterministic constraints, for example based on associating one of the flow identifiers with a corresponding transmission instance, and identifying a selected one data packet based on the corresponding flow identifier relative to the corresponding transmission instance associated with the data request; hence, the computing device 12 can identify a selected data packet belonging to an identified flow that is allocated the transmission instance of the data request.

Referring to FIG. 3C, the processor circuit 42 of the computing device 12 in operation 76 can supply one or more selected data packets 16 (retrieved from its mass storage device 14) to the requesting access point device 24 via the high-speed backbone data network 30, for reception by the requesting access point device 24 (e.g., "AP1" 24a and/or "AP2" 24b) before expiration of the associated pre-fetch interval. If in operation 78 the selected data packet 16 is flagged for multicast, allcast, broadcast, etc. (e.g., based on its flow identifier), the processor circuit 42 of the computing device 12 can continue to store the selected data packet 16, and replicate the selected data packet 16 as needed for each relevant data request until the data packet 16 has been replicated and forwarded to all required deterministic devices 20.

In response to the requesting access point device 24 (e.g., "AP1" 24a and/or "AP2" 24b) receiving in operation 80 the data packet 16 via the high-speed backbone data network 30 before expiration of the pre-fetch interval, the processor circuit 42 of the access point device 24 in operation 82 can repackage the data in the data packet 16 (if needed) into a data packet formatted for the deterministic data network 22, and the device interface circuit 40 of the access point device 24 in operation 84 can deterministically transmit the data packet (carrying the application data from the received data packet 16) at the transmission instance according to the deterministic constraints 28 for the deterministic transmission. The access point device 24 also can save in its local queue a copy of the application data if flagged for multicast, broadcast, allcast, etc., enabling the access point device 24 to replicate the application data until deterministic transmission has been completed to all the required deterministic device 20.

According to example embodiments, burst transmissions from a source device via a non-deterministic data network can be stored by a buffer device, implemented as a fog-based computing node and/or a cloud-based computing node, while awaiting deterministic transmission by a deterministic access point device. The storage by the buffer device into a mass storage medium eliminates the necessity to synchronize the source device with the deterministic access point devices of the deterministic network. The storage by the buffer device into a mass storage medium minimizes buffering requirements in the deterministic access point device, while preserving deterministic requirements for the deterministic transmission of the data packets.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   storing, by a computing device in a non-deterministic data network, a plurality of data packets originated by a source device into a mass storage medium associated with the computing device;
   receiving, by the computing device via the non-deterministic data network, a data request originated by a gateway device providing a deterministic link for deterministic reachability to a deterministic device in a deterministic data network providing reachability to multiple deterministic devices, the data request specifying one or more deterministic constraints associated with reaching the deterministic device, the one or more deterministic constraints requiring one of a deterministic schedule or an allocation of transmission credits, relative to one or more of a prescribed limited jitter, a prescribed limited latency, or a prescribed transmission burst size;
   supplying, by the computing device via the non-deterministic data network, a selected one of the data packets to the gateway device before an identified transmission instance of the selected one data packet by the gateway device, for delivery of data stored therein to the deterministic device via the deterministic data network according to the one or more deterministic constraints;
   determining, by the computing device, a pre-fetch interval for the gateway device to send the data request before the identified transmission instance that requires the gateway device to transmit the selected one data packet according to the one or more deterministic constraints, wherein the determining, by the computing device, of the pre-fetch interval comprises determining, for the pre-fetch interval:
      a receiving network latency of transmission of the data request from the gateway device to the computing device,
      a local retrieval latency for the computing device retrieving the selected one data packet,
      a transferring network latency for supplying the selected one data packet to the gateway device via the non-deterministic data network, and
      a transit queuing latency for the gateway device receiving and deterministically transmitting the data stored therein; and
   sending, by the computing device to one of the gateway device or a manager of the gateway device, the pre-fetch interval for initiation of the data request by the gateway device, ensuring the gateway device receives the selected one data packet before transmission thereof at the identified transmission instance.

2. The method of claim 1, further comprising receiving the data packets from the source device as a data burst that exceeds storage capabilities of the gateway device.

3. The method of claim 1, wherein the computing device is one of:
   a fog-based computing device coupled to a first high-speed backbone network providing connectivity between the gateway device and the fog-based computing device; or
   a cloud-based computing device that is reachable by the gateway device, and the source device, via a second high-speed data network;
   wherein the deterministic data network has a slower throughput than any one of the first high-speed backbone network or the second high-speed data network.

4. The method of claim 1, further comprising selecting the one data packet based on the deterministic constraints for transmission by the gateway device according to the deterministic constraints.

5. The method of claim 4, wherein:
   each data packet specifies a flow identifier associated with one or more of the deterministic devices;
   the method further comprises identifying the deterministic constraints based on associating one of the flow identifiers with a corresponding transmission instance;
   the supplying includes identifying the selected one data packet based on the corresponding flow identifier relative to a corresponding transmission instance associated with the data request.

6. The method of claim 1, wherein:
   the data packets are destined for at least one of the multiple deterministic devices reachable via the gateway device, or at least one of second multiple deterministic devices reachable via a second gateway device providing reachability thereof in a second deterministic network;
   the receiving includes receiving a second data request originated by the second gateway device;
   the supplying including supplying a selected second of the data packets to the second gateway device for delivery of corresponding data stored therein to one or more of the second multiple deterministic devices, according to second deterministic constraints.

7. The method of claim 1, wherein the storing includes establishing, for each of the multiple deterministic devices, a corresponding transmit buffer for storage of each data packet originated by the source device and destined for the corresponding deterministic device.

8. The method of claim 1, further comprising receiving the data packets from the gateway device for overflow storage of the data packets in the mass storage medium.

9. The method of claim 1, wherein the supplying includes replicating the identified one data packet, for delivery to each of the multiple deterministic devices according to the one or more deterministic constraints, based on a flow identifier specified in the one data packet.

10. An apparatus comprising:
    a device interface circuit configured for receiving, via a non-deterministic data network, a plurality of data packets originated by a source device; and
    a processor circuit configured for storing, via one of the device interface circuit or a second interface circuit, the data packets into a mass storage medium associated with the apparatus;

the device interface circuit configured for receiving a data request originated by a gateway device providing a deterministic link for deterministic reachability to a deterministic device in a deterministic data network providing reachability to multiple deterministic devices, the data request specifying one or more deterministic constraints associated with reaching the deterministic device, the one or more deterministic constraints requiring one of a deterministic schedule or an allocation of transmission credits, relative to one or more of a prescribed limited jitter, a prescribed limited latency, or a prescribed transmission burst size;

the processor circuit configured for supplying, via the device interface circuit, a selected one of the data packets to the gateway device via the non-deterministic data network before an identified transmission instance of the selected one data packet by the gateway device, for the delivery of data stored therein to the deterministic device according to the one or more deterministic constraints;

the processor circuit further configured for determining a pre-fetch interval for the gateway device to send the data request before the identified transmission instance that requires the gateway device to transmit the selected one data packet according to the one or more deterministic constraints, wherein the processor circuit is configured for determining the pre-fetch interval based on determining:
 a receiving network latency of transmission of the data request from the gateway device to the apparatus,
 a local retrieval latency for the apparatus retrieving the selected one data packet,
 a transferring network latency for supplying the selected one data packet to the gateway device via the non-deterministic data network, and
 a transmit queuing latency from the gateway device receiving and deterministically transmitting the data stored therein; and the processor circuit further configured for sending, to one of the gateway device or a manager of the gateway device, the pre-fetch interval for initiation of the data request by the gateway device, ensuring the gateway device receives the selected one data packet before transmission thereof at the identified transmission instance.

11. The apparatus of claim 10, wherein the device interface circuit is receiving the data packets from the source device as a data burst that exceeds storage capabilities of the gateway device.

12. The apparatus of claim 10, wherein the apparatus is implemented as one of:
 a fog-based computing device coupled to a first high-speed backbone network providing connectivity between the gateway device and the fog-based computing device; or
 a cloud-based computing device that is reachable by the gateway device, and the source device, via a second high-speed data network;
 wherein the deterministic data network has a slower throughput than any one of the first high-speed backbone network or the second high-speed data network.

13. The apparatus of claim 10, wherein the processor circuit is configured for selecting the one data packet based on the deterministic constraints for transmission by the gateway device according to the deterministic constraints.

14. The apparatus of claim 10, wherein:
 the data packets are destined for at least one of the multiple deterministic devices reachable via the gateway device, or at least one of second multiple deterministic devices reachable via a second gateway device providing reachability thereof in a second deterministic network;
 the device interface circuit configured for receiving a second data request originated by the second gateway device;
 the processor circuit configured for supplying a selected second of the data packets to the second gateway device for delivery of corresponding data stored therein to one or more of the second multiple deterministic devices, according to second deterministic constraints.

15. The apparatus of claim 10, wherein the processor circuit is configured for establishing, for each of the multiple deterministic devices, a corresponding transmit buffer for storage of each data packet originated by the source device and destined for the corresponding deterministic device.

16. The apparatus of claim 10, wherein the device interface circuit is configured for receiving the data packets from the gateway device for overflow storage of the data packets in the mass storage medium.

17. The apparatus of claim 10, wherein the processor circuit is configured for replicating the identified one data packet, for delivery to each of the multiple deterministic devices according to the one or more deterministic constraints, based on a flow identifier specified in the one data packet.

18. One or more non-transitory tangible media encoded with logic for execution by a machine and when executed by the machine operable for:
 storing, by the machine implemented as a computing device in a non-deterministic data network, a plurality of data packets originated by a source device into a mass storage medium associated with the computing device;
 receiving, by the computing device via the non-deterministic data network, a data request originated by a gateway device providing a deterministic link for deterministic reachability to a deterministic device in a deterministic data network providing reachability to multiple deterministic devices, the data request specifying one or more deterministic constraints associated with reaching the deterministic device, the one or more deterministic constraints requiring one of a deterministic schedule or an allocation of transmission credits, relative to one or more of a prescribed limited jitter, a prescribed limited latency, or a prescribed transmission burst size;
 supplying, by the computing device via the non-deterministic data network, a selected one of the data packets to the gateway device before an identified transmission instance of the selected one data packet by the gateway device, for delivery of data stored therein to the deterministic device via the deterministic data network according to the one or more deterministic constraints;
 determining a pre-fetch interval for the gateway device to send the data request before the identified transmission instance that requires the gateway device to transmit the selected one data packet according to the one or more deterministic constraints,
 wherein the determining, by the computing device, of the pre-fetch interval comprises determining, for the pre-fetch interval;

a receiving network latency of transmission of the request from the gateway device to the computing device, a local retrieval latency for the computing device retrieving the selected one data packet, a transferring network latency for supplying the selected one data packet to the gateway device via the non-deterministic data network, and a transmit queuing latency from the gateway device receiving and deterministically transmitting the data stored therein; and sending, to one of the gateway device or a manager of the gateway device, the pre-fetch interval for initiation of the data request by the gateway device, ensuring the gateway device receives the selected one data packet before transmission thereof at the identified transmission instance.

19. A method comprising:

identifying, by a gateway device, one or more deterministic constraints for transmitting a data packet originated by a source device and destined for a deterministic device via a deterministic data network;

receiving; by the gateway device, a pre-fetch interval for the gateway device to send to a computing device a request for the data packet, receive the data packet, and initiate deterministic transmission of the data packet at a deterministic transmission instance, wherein the pre-fetch interval comprises:

a receiving network latency of transmission of the request from the gateway device to the computing device, a local retrieval latency for the computing device retrieving the selected one data packet, a transferring network latency for supplying the selected one data packet to the gateway device via a non-deterministic data network, and a transmit queuing latency for the gateway device receiving and deterministically transmitting the data stored therein;

sending, by the gateway device to the computing device providing mass storage for data originated by the source device and destined for the deterministic data network, the request to the computing device via the non-deterministic data network by at least the pre-fetch interval before the deterministic transmission instance, the request specifying one or more deterministic constraints associated with deterministic transmission of the data packet according to the deterministic transmission instance, the one or more deterministic constraints requiring one of a deterministic schedule or an allocation of transmission credits, relative to one or more of a prescribed limited jitter, a prescribed limited latency, or a prescribed transmission burst size;

receiving, by the gateway device via the non-deterministic data network, the data packet before the deterministic transmission instance; and deterministically transmitting the data packet onto a deterministic link in the deterministic data network at the deterministic transmission instance, by the gateway device, in response to receipt thereof from the computing device.

* * * * *

UNITED STATES PATENT AND TRADEMARK OFFICE
CERTIFICATE OF CORRECTION

PATENT NO. : 10,897,516 B2
APPLICATION NO. : 15/813289
DATED : January 19, 2021
INVENTOR(S) : Wetterwald et al.

It is certified that error appears in the above-identified patent and that said Letters Patent is hereby corrected as shown below:

In the Claims

Column 14, Claim 10, Line 26, delete "for the delivery" and insert therefor --for delivery--.

Column 16, Claim 18, Line 37, delete "interval;" and insert therefor --interval:--.

Column 17, Claim 19, Line 6, delete "receiving;" and insert therefor --receiving,--.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*